United States Patent
Colson et al.

(10) Patent No.: US 10,174,765 B2
(45) Date of Patent: Jan. 8, 2019

(54) OUTLET HOUSING FOR CABIN AIR COMPRESSOR

(71) Applicant: Hamilton Sundstrand Corporation, Windsor Locks, CT (US)

(72) Inventors: Darryl A. Colson, West Suffield, CT (US); Murtuza Lokhandwalla, South Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 352 days.

(21) Appl. No.: 14/995,953

(22) Filed: Jan. 14, 2016

(65) Prior Publication Data
US 2017/0204874 A1 Jul. 20, 2017

(51) Int. Cl.
| | |
|---|---|
| F04D 29/42 | (2006.01) |
| F04D 29/44 | (2006.01) |
| F04D 25/02 | (2006.01) |
| F04D 25/06 | (2006.01) |
| B64D 13/02 | (2006.01) |
| B64F 5/40 | (2017.01) |
| B64D 13/06 | (2006.01) |

(Continued)

(52) U.S. Cl.
CPC ......... *F04D 29/4206* (2013.01); *B64D 13/02* (2013.01); *B64D 13/06* (2013.01); *B64F 5/40* (2017.01); *F04D 25/024* (2013.01); *F04D 25/0606* (2013.01); *F04D 29/056* (2013.01); *F04D 29/284* (2013.01); *F04D 29/441* (2013.01); *F04D 25/06* (2013.01); *F04D 29/462* (2013.01)

(58) Field of Classification Search
CPC .............. F04D 29/4206; F04D 25/024; F04D 25/0606; F04D 29/056; F04D 29/284; F04D 29/441; F04D 25/06; F04D 29/462; B64F 5/40; B64D 13/02; B64D 13/06
See application file for complete search history.

(56) References Cited

U.S. PATENT DOCUMENTS

| | | | |
|---|---|---|---|
| 6,401,473 B1 | 6/2002 | Ng et al. | |
| 7,097,411 B2 * | 8/2006 | Smoke | F01D 9/026 415/1 |

(Continued)

FOREIGN PATENT DOCUMENTS

CN 103573706 A 2/2014

*Primary Examiner* — Logan Kraft
*Assistant Examiner* — Eric Zamora Alvarez
(74) *Attorney, Agent, or Firm* — Kinney & Lange, P.A.

(57) ABSTRACT

An outlet housing for an aircraft cabin air compressor includes a volute comprising radially inner and outer portions, and having first, second, third, and fourth circumferential regions. The first circumferential region is between the fourth and second circumferential region. The second circumferential region is between the first circumferential region and the third circumferential region. The third circumferential region is between the second circumferential region and the fourth circumferential region. A portion of the volute in the first circumferential region has a first wall thickness. A portion of the volute in the second circumferential region has a second wall thickness. A portion of the volute in the third circumferential region has a third wall thickness. A portion of the volute in the fourth circumferential region has a fourth wall thickness.

19 Claims, 10 Drawing Sheets

(51) Int. Cl.
    *F04D 29/28*       (2006.01)
    *F04D 29/056*      (2006.01)
    *F04D 29/46*       (2006.01)

(56) References Cited

U.S. PATENT DOCUMENTS

| | | |
|---|---|---|
| 7,140,839 B2 | 11/2006 | McAuliffe et al. |
| 7,302,804 B2 | 12/2007 | Murry et al. |
| 7,322,202 B2 | 1/2008 | Zywiak et al. |
| 7,342,332 B2 | 3/2008 | McAuliffe et al. |
| 7,394,175 B2 | 7/2008 | McAuliffe et al. |
| 7,407,367 B2 | 8/2008 | McAuliffe et al. |
| 8,770,928 B2 | 7/2014 | Chrabascz et al. |
| 8,777,561 B2 | 7/2014 | Beers et al. |
| 8,882,454 B2 | 11/2014 | Chrabascz et al. |
| 9,181,959 B2 | 11/2015 | Rosen et al. |
| 2004/0005228 A1 | 1/2004 | Agrawal et al. |
| 2012/0011878 A1 | 1/2012 | Hipsky |
| 2012/0020776 A1 | 1/2012 | Colson et al. |
| 2012/0114463 A1 | 5/2012 | Beers et al. |
| 2014/0030070 A1* | 1/2014 | Beers .................. F04D 25/082 415/170.1 |
| 2014/0030080 A1 | 1/2014 | Chrabascz et al. |
| 2014/0199167 A1 | 7/2014 | Beers et al. |

\* cited by examiner

OUTLET HOUSING FOR CABIN AIR COMPRESSOR

BACKGROUND

The present disclosure relates to aircraft environmental control systems. More specifically, the present disclosure relates to an outlet housing in a cabin air compressor.

Cabin air compressors are used in environmental control systems in aircraft to condition air for delivery to an aircraft cabin. Conditioned air is air at a temperature, pressure, and humidity desirable for aircraft passenger comfort and safety. At or near ground level, the ambient air temperature and humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from the air by the air cycle machine before the air is delivered to the aircraft cabin.

A cabin air compressor can be used to compress air for use in an environmental control system. The cabin air compressor includes a motor to drive a compressor section that in turn compresses air flowing through the cabin air compressor. The cabin air compressor also includes an outlet housing that directs the flow of compressed air. Increased pressure, temperature, and maneuver loads result in more stress on the cabin air compressor outlet housing.

SUMMARY

In one embodiment, an outlet housing for a cabin air compressor includes a volute and a compressor outlet. The volute includes a radially outer portion, a radially inner portion, a first circumferential region having at least a portion with a first wall thickness, a second circumferential region having at least a portion with a second wall thickness, a third circumferential region having at least a portion with a third wall thickness, and a fourth circumferential region having at least a portion with a fourth wall thickness. The compressor outlet is located in the first circumferential region.

The first circumferential region is between the fourth and second circumferential region. The second circumferential region is between the first circumferential region and the third circumferential region. The third circumferential region is between the second circumferential region and the fourth circumferential region. The fourth circumferential region is between the first circumferential region and the third circumferential region. The first wall thickness is greater than the second wall thickness, the third wall thickness, and the fourth wall thickness. The second wall thickness is less than the third wall thickness and the fourth wall thickness, and the third wall thickness is greater than the fourth wall thickness.

In another embodiment, an aircraft cabin air compressor assembly includes an outlet housing, an inlet housing, a compressor rotor having a plurality of blades, a motor housing, and a motor having a drive shaft. The outlet housing includes a volute, a support ring, a journal bearing support sleeve, a web, and a compressor outlet. The volute has a radially inner portion, a radially outer portion, a first circumferential region, a second circumferential region, a third circumferential region, and a fourth circumferential region. The compressor outlet is located in the first circumferential region of the volute. The support ring is connected to the radially inner portion of the volute, the web is between and is connected to both the journal bearing support sleeve and the support ring. The inlet housing is connected to the outlet housing. The compressor rotor is positioned within the outlet housing. The motor housing is connected to the outlet housing at the support ring. The drive shaft extends through the journal bearing support sleeve and is connected to the compressor rotor.

The first circumferential region has at least a portion with a first wall thickness. The second circumferential region has at least a portion with a second wall thickness. The third circumferential region has at least a portion with a third wall thickness. The fourth circumferential region has at least a portion with a fourth wall thickness.

The first circumferential region is between the fourth circumferential region and the second circumferential region, the second circumferential is between the fourth circumferential region and the third circumferential region, the third circumferential region is between the second circumferential region and the fourth circumferential region, and the fourth circumferential region is between the first circumferential region and the third circumferential region. The first wall thickness is greater than the second wall thickness, the third wall thickness, and the fourth wall thickness. The second wall thickness is less the third wall thickness and the fourth wall thickness. The third wall thickness is greater than the fourth wall thickness.

DETAILED DESCRIPTION

Figure 1:
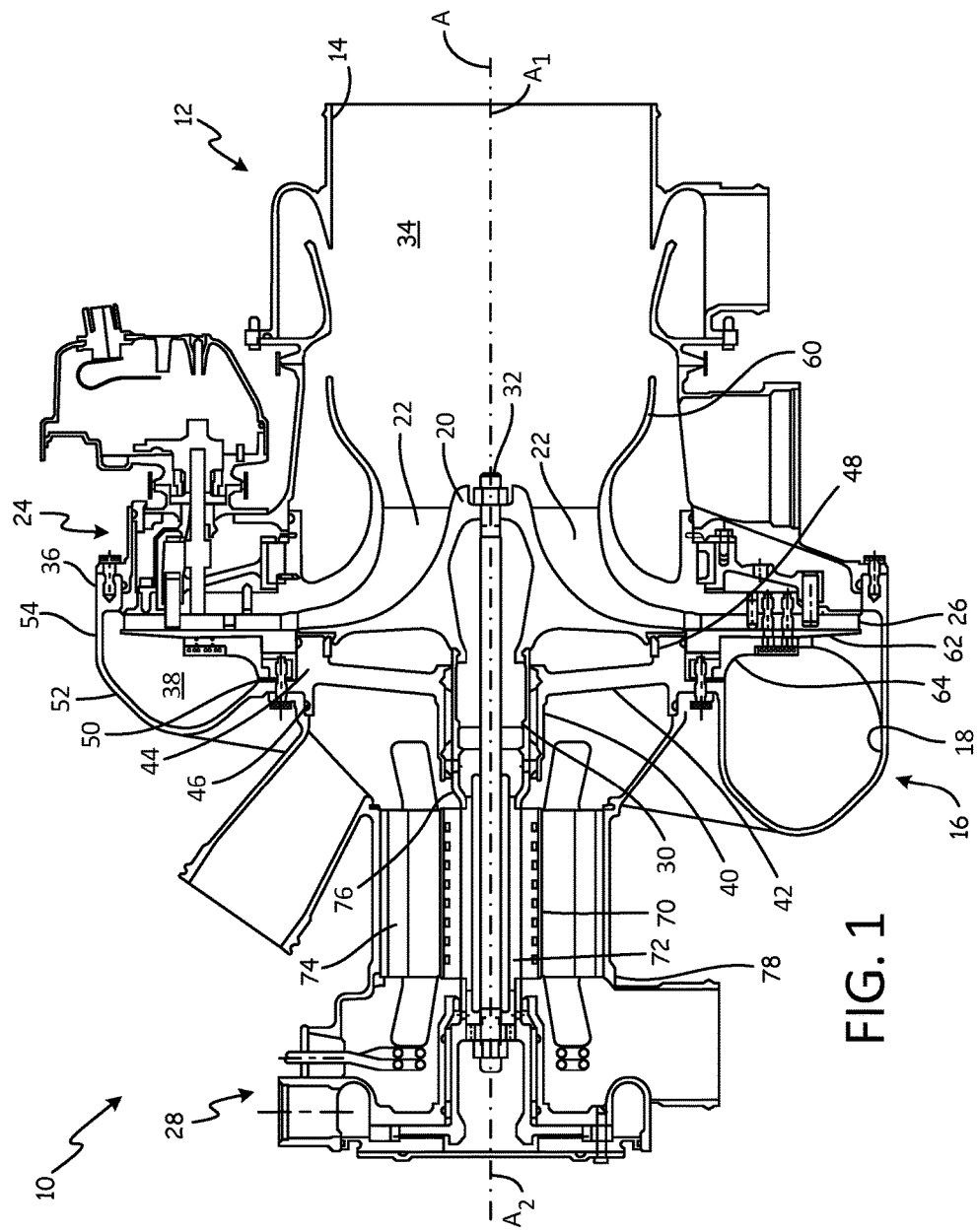
FIG. 1 is cross-sectional view of a cabin air compressor.

FIG. 1 is a cross-sectional view of cabin air compressor 10. Cabin air compressor 10 includes compressor inlet housing 12 with compressor inlet 14, compressor outlet housing 16 with compressor outlet 18, compressor rotor 20 with blades 22, variable diffuser 24 with vanes 26, electric motor 28, journal bearing 30, and tie rod 32. Compressor inlet housing 12 includes compressor inlet 14, inlet chamber 34, and inlet rim 36. Compressor outlet housing 16 includes compressor outlet 18, outlet volute 37 (which includes radially inner portion 38 and radially outer portion 39 as shown in FIG. 2B), journal bearing support sleeve 40, web 42, annular support ring 44 (which includes motor mount flange 46, rotor seal flange 48, and annular mounting region 50), outlet volute wall 52, and outlet rim 54. Variable diffuser 24 includes vanes 26, shroud 60, backing plate 62, and mounting plate 64. Electric motor 28 includes motor rotor 70 with rotor shaft 72, motor stator 74, drive shaft 76, and motor housing 78. Also shown in FIG. 1 is axis A having first end $A_1$ and second end $A_2$.

Compressor inlet housing 12 is connected to variable diffuser 24 and to the $A_1$ facing side of compressor outlet housing 16. Compressor inlet 14 is positioned at the $A_1$ facing end of compressor inlet housing 12. The outer boundaries of inlet chamber 34 are defined by compressor inlet housing 12. Inlet rim 36 is positioned radially outward from axis A and is connected to outlet rim 54.

Compressor outlet housing 16 is connected to variable diffuser 24, the $A_2$ facing end of compressor inlet housing 12, and the $A_1$ facing end of electric motor 28. Compressor outlet 18 is positioned radially away from axis A. The outer boundaries of outlet volute 37 are defined by compressor outlet housing 16. Support sleeve 40 is connected to journal bearing 30 and web 42. Web 42 is connected to journal bearing sleeve 40 and annular mounting region 50. Annular support ring 44 is connected to compressor rotor 20 motor mount flange 46, rotor seal flange 48, annular mounting region 50, and outlet volute wall 52. Motor mount flange 46 is connected to motor housing 78. Annular mounting region 50 is connected to variable diffuser 24. Compressor rotor 20 is connected to blades 22, compressor outlet housing 16, and tie rod 32.

Variable diffuser 24 is connected to compressor inlet housing 12 and compressor outlet housing 16. Shroud 60 is connected to compressor inlet housing 12. Vanes 22 are positioned between shroud 60 and backing plate 62. Backing plate 62 is connected to mounting plate 64.

Electric motor 28 is connected to the $A_2$ facing end of compressor outlet housing 16 and to tie rod 32. Motor rotor 70 rotates within motor stator 74. Rotor shaft 72 of motor rotor 70 is connected to drive shaft 76. Drive shaft 76 is connected to compressor rotor 20. Tie rod 32 is connected to compressor rotor 20, electric motor 28, and journal bearing 30. Tie rod 32 is centered on axis A.

Tie rod 32 axially restrains and aligns electric motor 28, compressor rotor 20, compressor outlet housing 16, and compressor inlet housing 12. Journal bearing 30 supports tie rod 32 and permits rotation of drive shaft 76 about axis A. Electric motor 28 rotates motor rotor 70, which in turn rotates rotor shaft 72. Rotor shaft 72 of motor rotor 70 drives drive shaft 76, which in turn drives compressor rotor 20 with blades 22. The rotation of compressor rotor 20 draws air into inlet chamber 34 of compressor inlet housing 12 at compressor inlet 14. The air in inlet chamber 34 is compressed by compressor rotor 20. The compressed air is then routed to variable diffuser 24. Vanes 26 can be positioned to allow air to flow through variable diffuser 24 without further compressing the air. Vanes 26 can also be positioned to further compress the air flowing through variable diffuser 24 before that air enters outlet volute 37. The compressed air leaves variable diffuser 24 and is routed through outlet volute 37 before exiting compressor outlet 18.

Figure 2A:
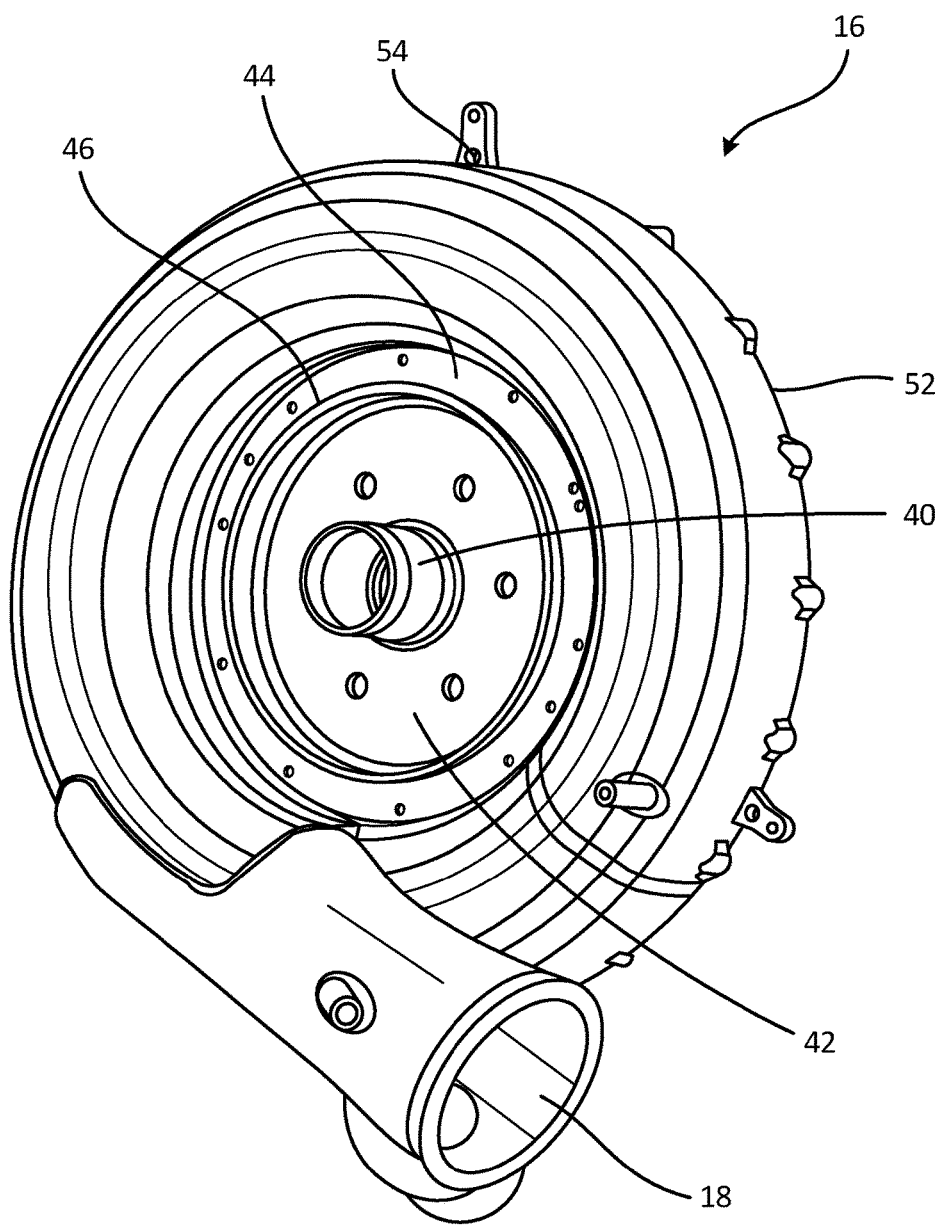
FIG. 2A is a perspective view of a motor facing end of a compressor outlet housing for the cabin air compressor of FIG. 1.
Figure 2B:
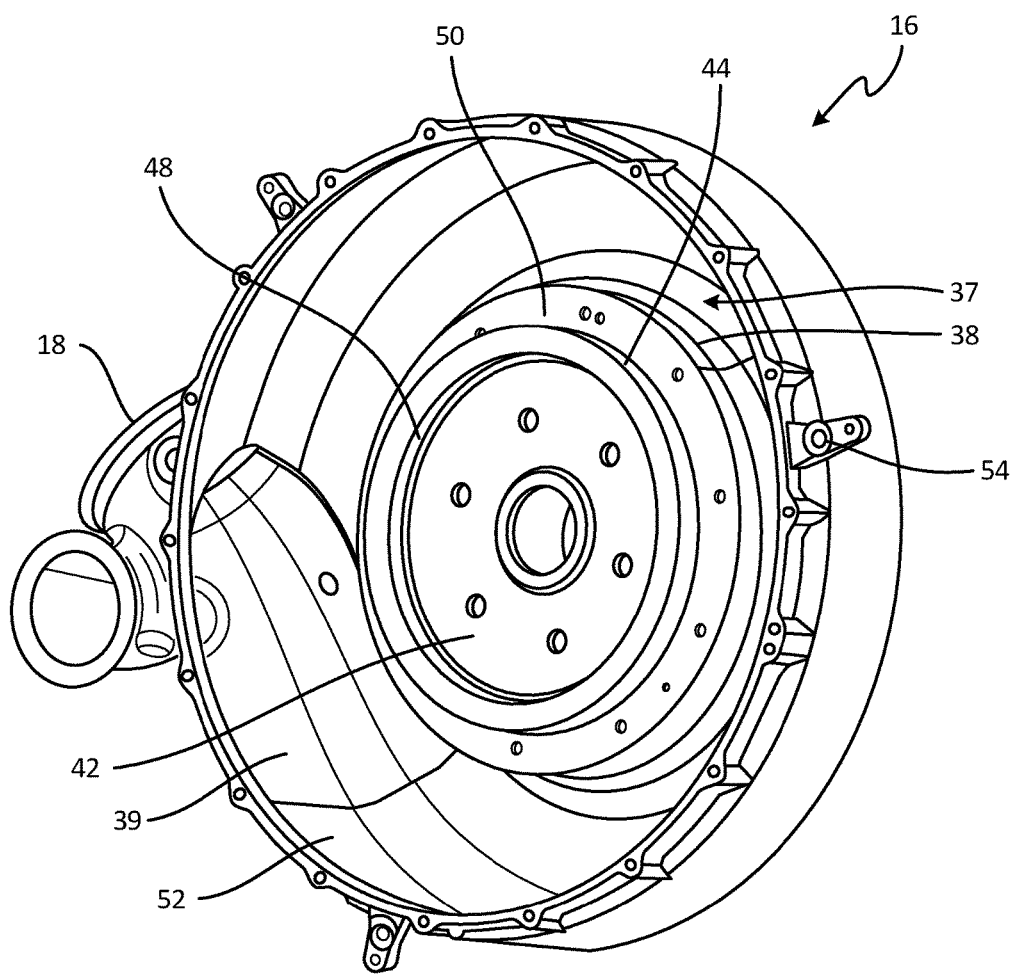
FIG. 2B is a perspective view of a compressor inlet facing end of a compressor outlet housing for the cabin air compressor of FIG. 1.

FIG. 2A is a perspective view of $A_2$ facing end of compressor outlet housing 16. FIG. 2B is a perspective view of $A_1$ facing end of compressor outlet housing 16. FIGS. 2A and 2B are discussed concurrently. Compressor outlet housing 16 is aligned with axis A and includes compressor outlet 18, outlet volute 37, journal bearing support sleeve 40, web 42, annular support ring 44 (which includes motor mount flange 46, rotor seal flange 48, and annular mounting region 50), outlet volute wall 52, and outlet rim 54. Outlet volute 37 includes radially inner portion 38 and radially outer portion 39. Journal bearing support sleeve 40 is positioned at the center of compressor outlet housing 16. Support sleeve 40 is connected to web 42. Web 42 extends between and connects journal bearing sleeve 40 and annular support ring 44. Annular support ring 44 is connected to the radial outward end of web 42. Annular support ring 44 is also connected to the radially inner portion 38 of outlet volute 37. Outlet volute wall 52 is connected to outlet rim 54 at the radially outer portion 39 of outlet volute 37.

Journal bearing support sleeve 40 provides support to journal bearing 30. Web 42 connects to annular support ring 44. Annular support ring 44 connects to motor mount flange 46, rotor seal flange 48, annular mounting region 50, and outlet volute wall 52. Motor mount flange 46 aligns compressor outlet housing 16 to motor housing 78. Annular mounting region 50 connects compressor outlet housing 16 to mounting plate 64 of variable diffuser 24. Outlet volute wall 52 defines the outer contours of outlet volute 37. Outlet rim 54 connects outlet housing 16 to compressor inlet housing 12 at inlet rim 36.

Figure 3:
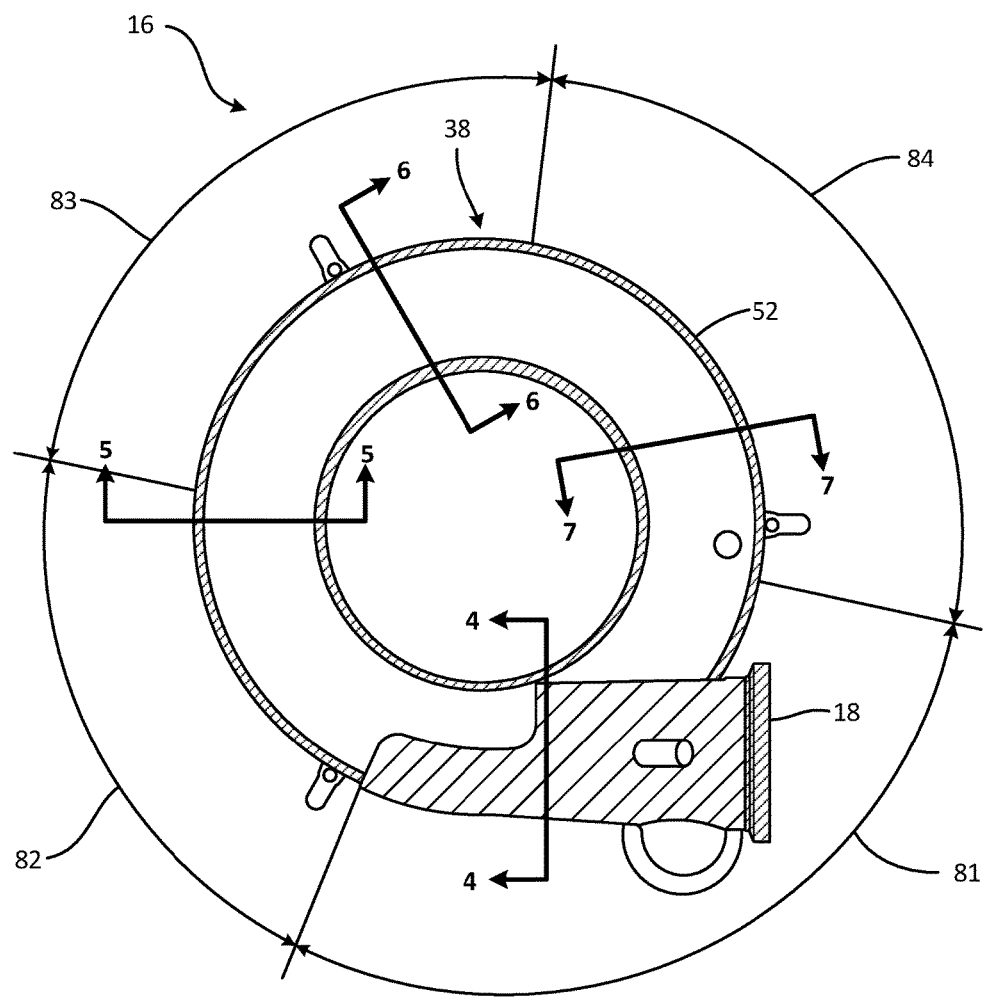
FIG. 3 is an elevational view of the motor facing end of the outlet housing seen in FIG. 2B.

FIG. 3 is an elevational end view of the motor facing end of the outlet housing 16 which includes compressor outlet 18, outlet volute 37, and outlet volute wall 52. Outlet volute wall 52 has four circumferential regions: first circumferential region 81, second circumferential region 82, third circumferential region 83, and fourth circumferential region 84. First circumferential region 81 is also designated by hatching.

Figure 4:
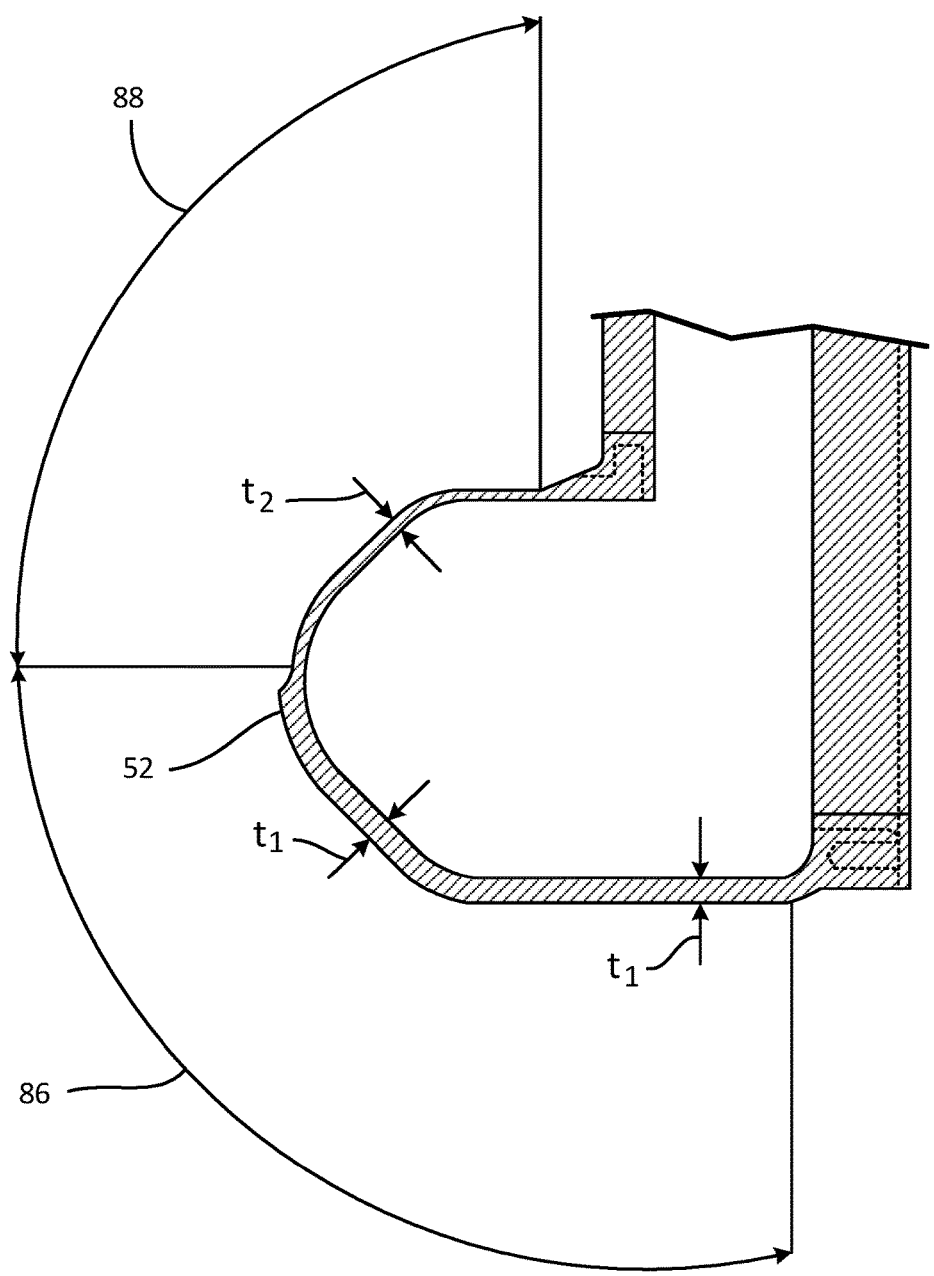
FIG. 4 is a cross-sectional view taken along section line 4-4 of FIG. 3.

FIG. 4 is a cross-sectional view taken along section 4-4 (shown in FIG. 3) in first circumferential region 81. Outlet volute wall 52 has two portions 86 and 88 of different thickness in first circumferential region 81. Portion 86 of outlet volute wall 52 has thickness $t_1$. Portion 88 has thickness $t_2$. In one embodiment, thickness $t_1$ is between 0.71 centimeters (0.28 inches) and 0.61 centimeters (0.24 inches) and thickness $t_2$ is between 0.28 centimeters (0.11 inches) and 0.18 centimeters (0.07 inches). The ratio of $t_1$ to $t_2$ is less than or equal to 4.00 and greater than or equal to 2.18 to handle increased temperature, pressure, and maneuver loads while minimizing the weight of outlet housing 16.

Figure 5:
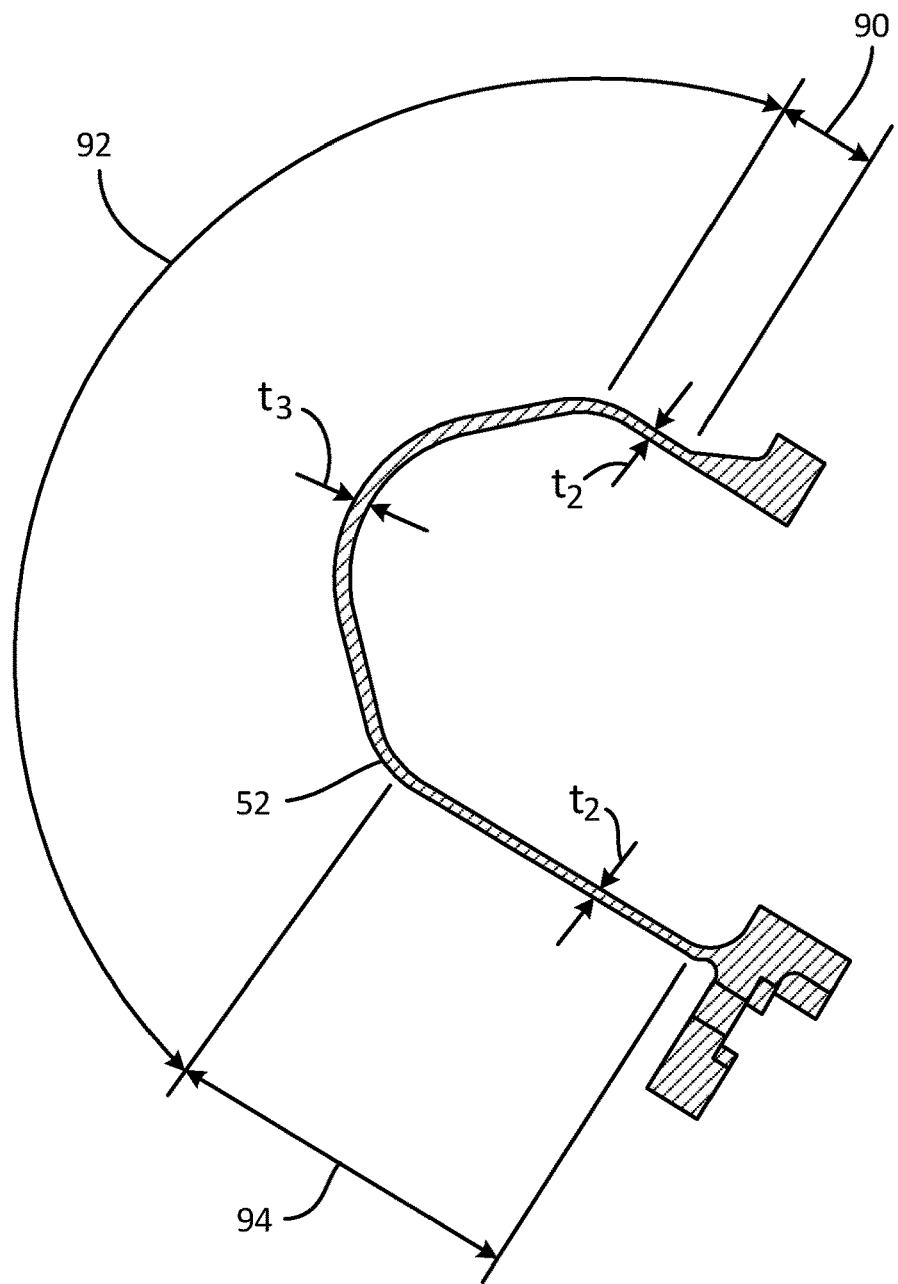
FIG. 5 is a cross-sectional view taken along section line 5-5 of FIG. 3.

FIG. 5 is a cross-sectional view taken along section 5-5 (shown in FIG. 3) in second circumferential region 82. Outlet volute wall 52 has three portions 90, 92, and 94 in second circumferential region 82. Portions 90 and 94 of outlet volute wall 52 have thickness $t_2$. Portion 92 of outlet volute wall 52 has thickness $t_3$. In one embodiment, thickness $t_3$ is between 0.41 centimeters (0.16 inches) and 0.31 centimeters (0.12 inches). Thicknesses $t_2$ and $t_3$ in second circumferential region 82 allow outlet volute 37 to handle increased temperature, pressure, and maneuver loads while minimizing the weight of outlet housing 16.

Figure 6:
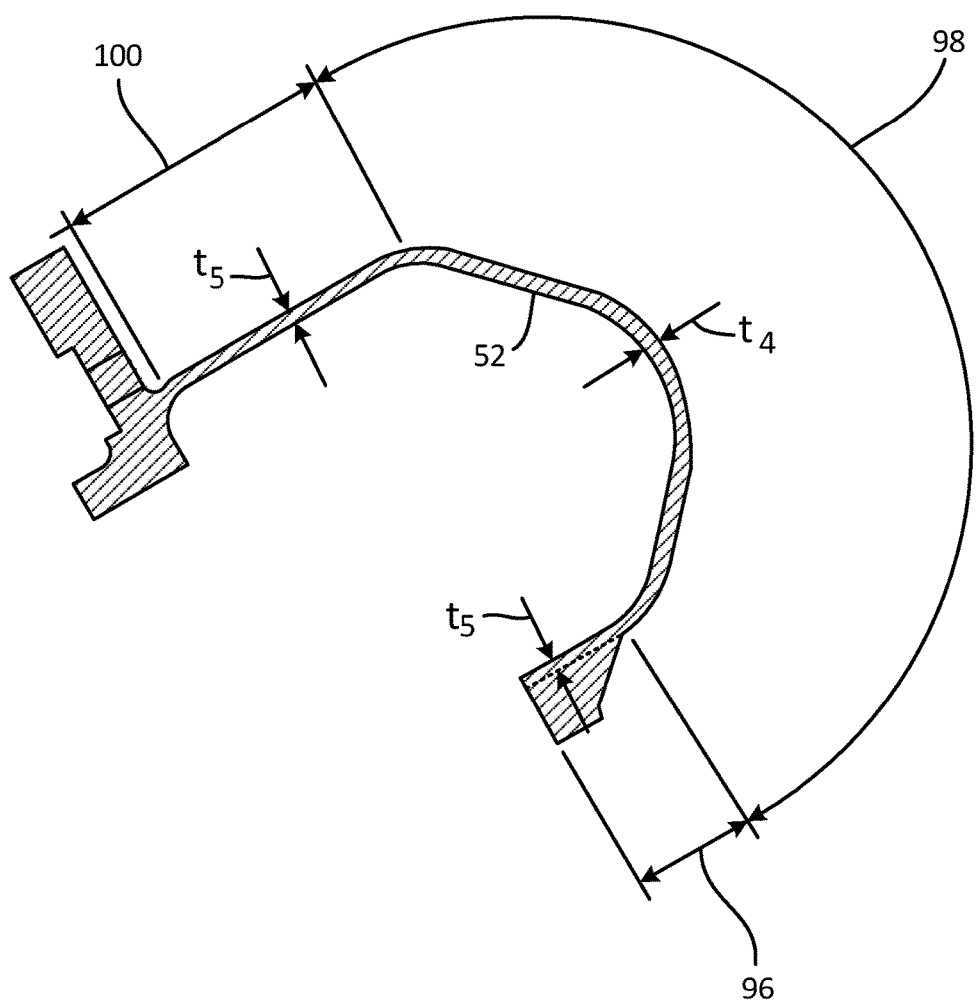
FIG. 6 is a cross-sectional view taken along section line 6-6 of FIG. 3.

FIG. 6 is a cross-sectional view taken along section 6-6 (shown in FIG. 3) in third circumferential region 83. Outlet volute wall 52 has three portions 96, 98, and 100 in third circumferential region 83. Portion 98 of outlet volute wall 52 in third circumferential region 83 has thickness $t_4$. In one embodiment, thickness $t_4$ is between 0.46 centimeters (0.18 inches) and 0.36 centimeters (0.14 inches). The ratio of $t_4$ to $t_2$ is less than or equal to 2.58 and greater than or equal to 1.27. Portions 96 and 100 of outlet volute wall 52 have thickness $t_5$. In one embodiment, thickness $t_5$ is between 0.33 centimeters (0.130 inches) and 0.23 centimeters (0.090 inches). Thicknesses $t_4$ and $t_5$ in third circumferential region 83 allow outlet volute 37 to handle increased temperature, pressure, and maneuver loads while minimizing the weight of outlet housing 16.

Figure 7:
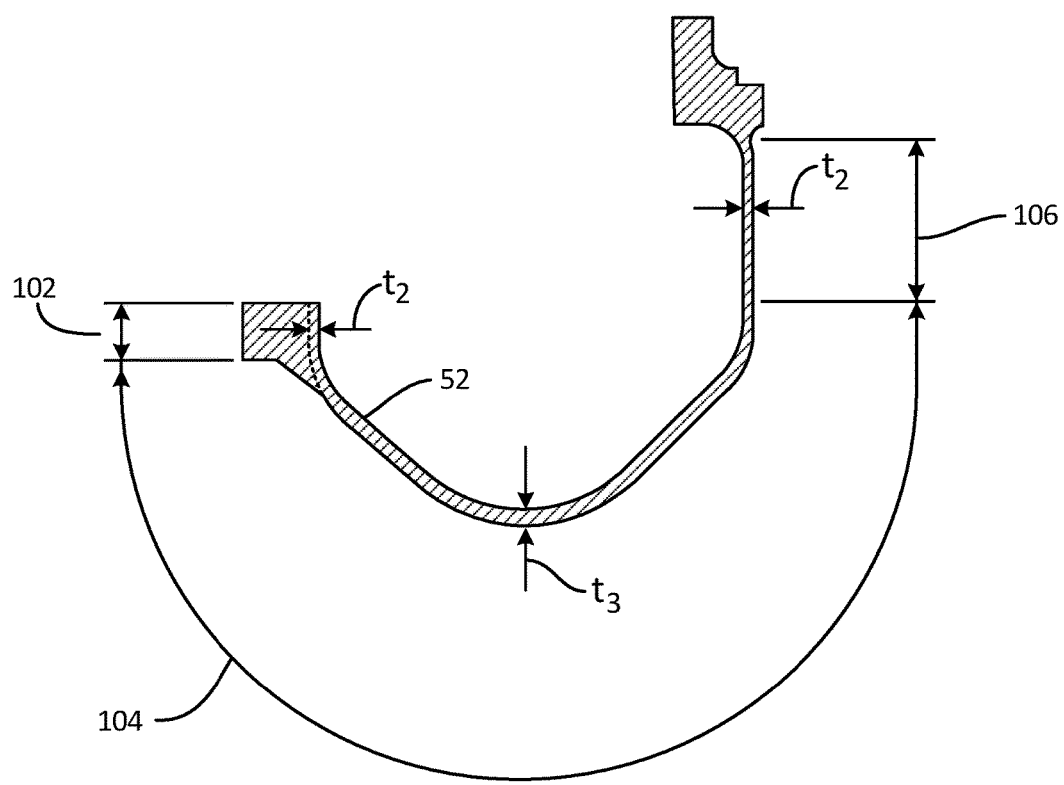
FIG. 7 is a cross-sectional view taken along section line 7-7 of FIG. 3.

FIG. 7 is a cross-sectional view taken along section 7-7 (shown in FIG. 3) in fourth circumferential region 84. Outlet volute wall 52 has portions 102, 104, and 106 in fourth circumferential region 84. Portions 102 and 106 of outlet volute wall 52 have thickness $t_2$. Portion 104 of outlet volute wall 52 has thickness $t_3$. Thickness $t_3$ is between 0.41 centimeters (0.16 inches) and 0.31 centimeters (0.12 inches). The ratio of $t_3$ to $t_2$ is less than or equal to 2.29 and greater than or equal to 1.09 to handle increased temperature, pressure, and maneuver loads while minimizing weight.

Figure 8:
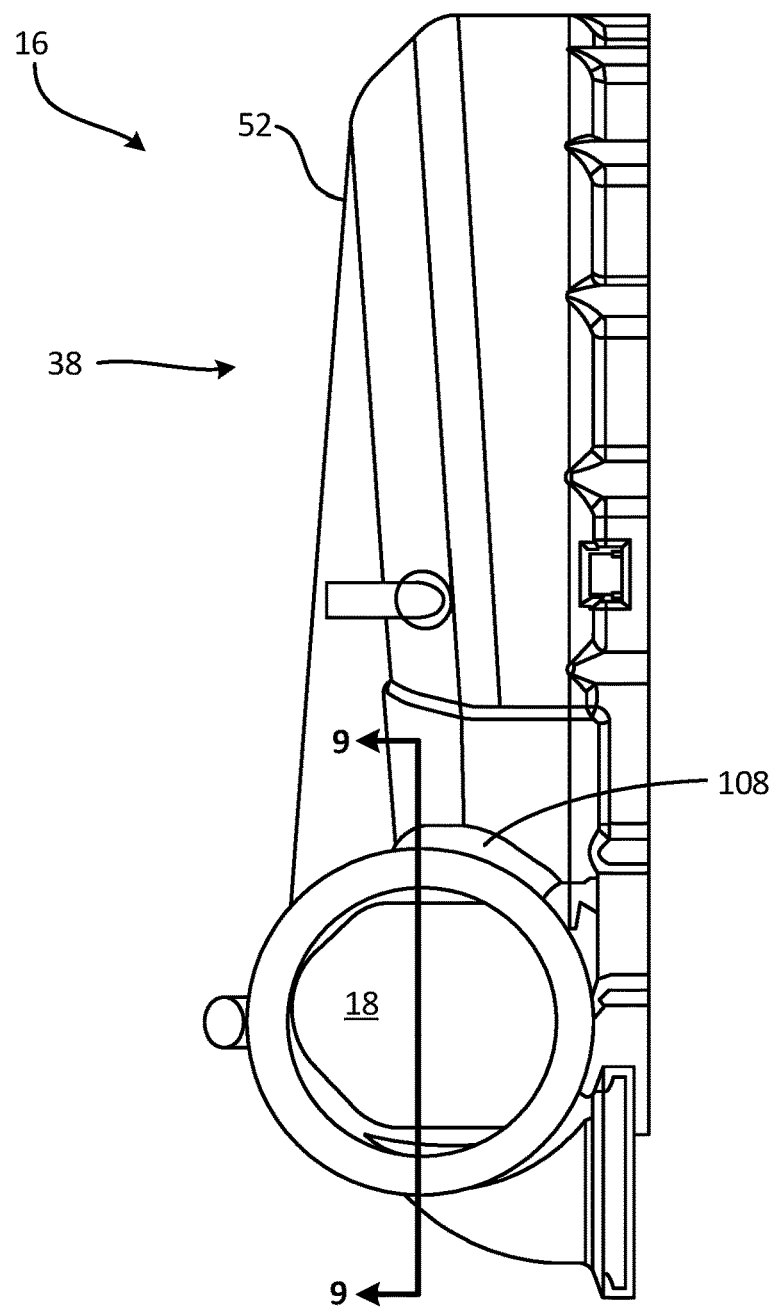
FIG. 8 is a side elevational view of the outlet housing and compressor outlet.

FIG. 8 is a side view of outlet housing 16. Outlet housing 16 includes compressor outlet 18, outlet volute 37, outlet volute wall 52, and fillet 108. Fillet 108 connects compressor outlet 18 to outlet volute 37.

Figure 9:
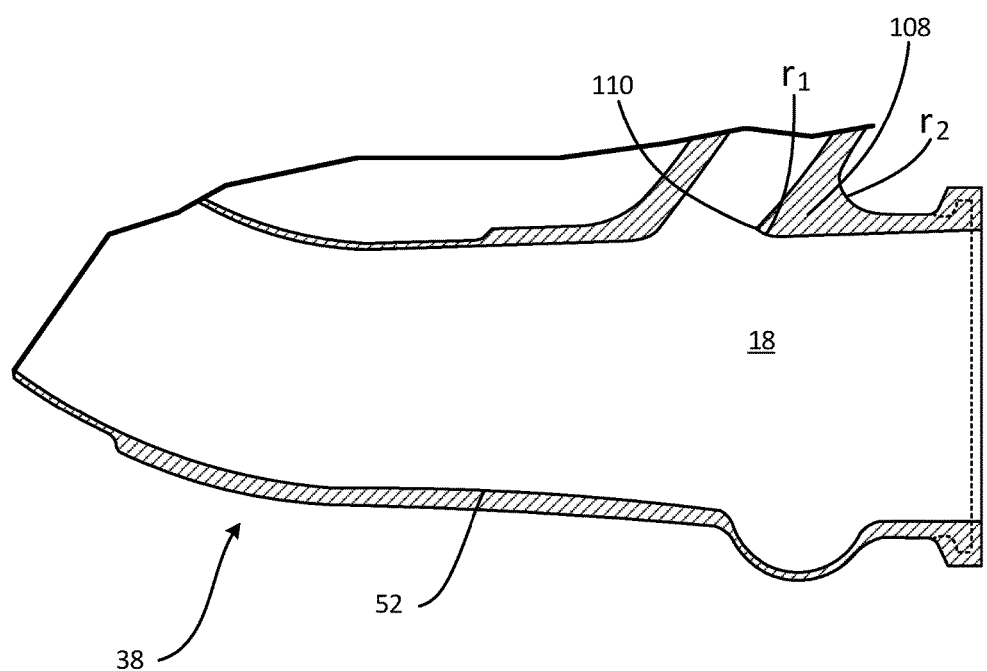
FIG. 9 is a cross-sectional view taken along section line 9-9 of FIG. 8.

FIG. 9 is a cross-sectional view of outlet housing 16 taken along line 9-9. Compressor outlet 18 and outlet volute 37 contact each other to form inner radius 110 having radius $r_1$. Fillet 108 has fillet radius $r_2$. Fillet 108 connects outlet volute 37 and compressor outlet 18. Radius $r_1$ is between 0.39 centimeters (0.16 inches) and 0.24 centimeters (0.10 inches). Radius $r_2$ is between 1.6 centimeters (0.630 inches) and 1.45 centimeters (0.57 inches). The ratio between radius $r_2$ and $r_1$ is less than or equal to 6.63 and greater than or equal to 3.67. The ratio between $r_2$ and $r_1$ allows the housing to handle increased temperature, pressure, and maneuver loads while minimizing the weight of the outlet housing.

DISCUSSION OF POSSIBLE EMBODIMENTS

The following are non-exclusive descriptions of possible embodiments of the present invention.

An outlet housing for an aircraft cabin air compressor includes a volute and a compressor outlet. The volute further includes a radially outer portion, a radially inner portion, a first circumferential region having at least a portion with a first wall thickness, a second circumferential region having at least a portion with a second wall thickness, a third circumferential region having at least a portion with a third wall thickness, and a fourth circumferential region having at least a portion with a fourth wall thickness. The first circumferential region is between the fourth circumferential region and the second circumferential region, the second circumferential region is between the first circumferential region and the third circumferential region, the third circumferential region is between the second circumferential region and the fourth circumferential region, and the fourth circumferential region is between the first circumferential region and the third circumferential region. The compressor outlet is located in the first circumferential region of the volute. The first wall thickness is greater than the second wall thickness, the third wall thickness, and the fourth wall thickness. The second wall thickness is less than the third wall thickness and the fourth wall thickness. The third wall thickness is greater than the fourth wall thickness.

The outlet housing of the preceding paragraph can optionally include, additionally and/or alternatively, any one or more of the following features, configurations and/or additional components:

A support ring connected to the radially inner portion of the volute, a journal bearing support sleeve, and a web between the journal bearing support sleeve and the support ring.

A ratio of the first wall thickness to the second wall thickness is less than or equal to 4.00 and greater than or equal to 2.18.

A ratio of the third wall thickness to the second wall thickness is less than or equal to 2.58 and greater than or equal to 1.27.

A ratio of the fourth wall thickness to the second wall thickness is less than or equal to 2.29 and greater than or equal to 1.09.

A fillet in the first circumferential region between a surface of the wall and a surface of the compressor outlet, the fillet having a fillet radius wherein the first circumferential region includes an inner radius defined by the intersection of the surface of the volute and the surface of the compressor outlet, and wherein a ratio of the fillet radius to the inner radius is less than or equal to 6.63 and greater than or equal to 3.67.

The first circumferential region includes a portion with a wall thickness less than the first wall thickness adjacent to the portion with the first wall thickness.

The second circumferential region includes a portion with a wall thickness greater than the second wall thickness between two portions having the second wall thickness.

The third circumferential region includes two portions with a wall thickness less than the third wall thickness adjacent to the portion with the third wall thickness.

The fourth circumferential region includes two portions with a wall thickness less than the fourth wall thickness adjacent to the portion with the fourth wall thickness.

An aircraft cabin air compressor assembly includes an outlet housing, an inlet housing, a compressor rotor having a plurality of blades, a motor housing, and a motor having a drive shaft. The outlet housing includes a volute, a support ring, a journal bearing support sleeve, a web, and a compressor outlet. The volute has a radially inner portion, a radially outer portion, a first circumferential region, a second circumferential region, a third circumferential region, and a fourth circumferential region. The compressor outlet is located in the first circumferential region of the volute. The support ring is connected to the radially inner portion of the volute, the web is between and is connected to both the journal bearing support sleeve and the support ring. The inlet housing is connected to the outlet housing. The compressor rotor is positioned within the outlet housing. The motor housing is connected to the outlet housing at the support ring. The drive shaft extends through the journal bearing support sleeve and is connected to the compressor rotor.

The aircraft cabin air compressor of the preceding paragraph can optionally include, additionally and/or alternatively, any one or more of the following features, configurations and/or additional components:

A ratio of the first wall thickness to the second wall thickness is less than or equal to 4.00 and greater than or equal to 2.18.

A ratio of the third wall thickness to the second wall thickness is less than or equal to 2.58 and greater than or equal to 1.27.

A ratio of the fourth wall thickness to second wall thickness is less than or equal to 2.29 and greater than or equal to 1.09.

A fillet in the first circumferential region between a surface of the volute and a surface of the compressor outlet, the fillet having a fillet radius wherein the first circumferential region includes an inner radius defined by the intersection of the surface of the volute and the surface of the compressor outlet, and wherein a ratio of the fillet radius to the inner radius is less than or equal to 6.63 and greater than or equal to 3.67.

The first circumferential region includes a portion with a wall thickness greater than the second wall thickness adjacent to the portion with the first wall thickness.

The second circumferential region includes a portion with a wall thickness greater than the second wall thickness between two portions having the second wall thickness.

The third circumferential region includes two portions with a wall thickness less than the third wall thickness adjacent to the portion with the third wall thickness.

The fourth circumferential region includes two portions with a wall thickness less than the fourth wall thickness adjacent to the portion with the fourth wall thickness.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An outlet housing for an aircraft cabin air compressor, the outlet housing comprising:
    a volute comprising:
        a radially outer portion;
        a radially inner portion;
        a first circumferential region having a portion with a wall thickness $t_1$ on the radially outer portion of the volute;
        a second circumferential region having a portion with a wall thickness $t_2$ on the radially outer portion of the volute and a portion with the wall thickness $t_2$ on the radially inner portion of the volute;
        a third circumferential region having a portion with a wall thickness $t_4$ between the radially outer portion and the radially inner portion of the volute; and
        a fourth circumferential region having a portion with a wall thickness $t_3$ between the radially outer portion and the radially inner portion of the volute;
        wherein the first circumferential region is between the fourth circumferential region and the second circumferential region, the second circumferential region is between the first circumferential region and the third circumferential region, the third circumferential region is between the second circumferential region and the fourth circumferential region, and the fourth circumferential region is between the first circumferential region and the third circumferential region; and
        wherein the wall thickness $t_1$ is greater than the wall thickness $t_2$, the wall thickness $t_4$, and the wall thickness $t_3$; the wall thickness $t_2$ is less than the wall thickness $t_4$ and the wall thickness $t_3$; and the wall thickness $t_4$ is greater than the wall thickness $t_3$; and
    a compressor outlet located in the first circumferential region of the volute.

2. The outlet housing of claim 1 further comprising:
    a support ring connected to the radially inner portion of the volute;
    a journal bearing support sleeve; and
    a web between the journal bearing support sleeve and the support ring.

3. The outlet housing of claim 1, wherein a ratio of the wall thickness $t_1$ to the wall thickness $t_2$ is less than or equal to 4.00 and greater than or equal to 2.18.

4. The outlet housing of claim 1, wherein a ratio of the wall thickness $t_4$ to the wall thickness $t_2$ is less than or equal to 2.58 and greater than or equal to 1.27.

5. The outlet housing of claim 1, wherein a ratio of the wall thickness $t_3$ to the wall thickness $t_2$ is less than or equal to 2.29 and greater than or equal to 1.09.

6. The outlet housing of claim 1, further comprising:
    a fillet in the first circumferential region between a surface of the volute and a surface of the compressor outlet, the fillet having a fillet radius;
    wherein the first circumferential region includes an inner radius defined by the intersection of the surface of the volute and the surface of the compressor outlet, and wherein a ratio of the fillet radius to the inner radius is less than or equal to 6.63 and greater than or equal to 3.67.

7. The outlet housing of claim 1, wherein the first circumferential region includes a portion with the wall thickness $t_2$ adjacent to the portion with the wall thickness $t_1$.

8. The outlet housing of claim 1, wherein the second circumferential region includes a portion with the wall thickness $t_3$ between the two portions having the wall thickness $t_2$.

9. The outlet housing of claim 1, wherein the third circumferential region includes a portion with a wall thickness $t_5$ on the radially outer portion of the volute and a portion with the wall thickness $t_5$ on the radially inner portion of the volute, wherein the two portions with the wall thickness $t_5$ are adjacent opposite sides of the portion having the wall thickness $t_4$, and wherein the wall thickness $t_5$ is less than the wall thickness $t_4$.

10. The outlet housing of claim 1, wherein the fourth circumferential region includes a portion with the wall thickness $t_2$ on the radially outer portion of the volute and a portion with the wall thickness $t_2$ on the radially inner portion of the volute, wherein the two portions with the wall thickness $t_2$ are adjacent opposite sides of the portion having the wall thickness $t_3$.

11. An aircraft cabin air compressor assembly comprising:
    an outlet housing comprising:
        a volute comprising:
            a radially outer portion;
            a radially inner portion;
            a first circumferential region having a portion with a wall thickness $t_1$ on the radially outer portion of the volute;
            a second circumferential region having a portion with a wall thickness $t_2$ on the radially outer portion of the volute and a portion with the wall thickness $t_2$ on the radially inner portion of the volute;
            a third circumferential region having a portion with a wall thickness $t_4$ between the radially outer portion and the radially inner portion of the volute; and
            a fourth circumferential region having a portion with a wall thickness $t_3$ between the radially outer portion and the radially inner portion of the volute;
        a support ring connected to the radially inner portion of the volute;
        a journal bearing support sleeve;

a web connected between the journal bearing support sleeve and the support ring; and a compressor outlet located in the first circumferential region of the volute;

an inlet housing connected to the outlet housing;

a compressor rotor positioned within the inlet housing and having a plurality of blades;

a motor housing connected to the outlet housing at the support ring;

a motor positioned within the motor housing and having a drive shaft that extends through a journal bearing and is connected to the compressor rotor;

wherein the first circumferential region is between the fourth circumferential region and the second circumferential region, the second circumferential region is between the fourth circumferential region and the third circumferential region, the third circumferential region is between the second circumferential region and the fourth circumferential region, and the fourth circumferential region is between the first circumferential region and the third circumferential region; and wherein the wall thickness $t_1$ is greater than the wall thickness $t_2$, the wall thickness $t_4$, and the wall thickness $t_3$; the wall thickness $t_2$ is less the wall thickness $t_4$ and the wall thickness $t_3$; and the third wall thickness $t_4$ is greater than the fourth wall thickness $t_3$.

12. The assembly of claim 11, wherein a ratio of the wall thickness $t_1$ to the wall thickness $t_2$ is less than or equal to 4.00 and greater than or equal to 2.18.

13. The assembly of claim 11, wherein a ratio of the wall thickness $t_4$ to the wall thickness $t_2$ is less than or equal to 2.58 and greater than or equal to 1.27.

14. The assembly of claim 11, wherein a ratio of the wall thickness $t_3$ to the wall thickness $t_2$ is less than or equal to 2.29 and greater than or equal to 1.09.

15. The assembly of claim 11, further comprising:

a fillet in the first circumferential region between a surface of the volute and a surface of the compressor outlet, the fillet having a fillet radius;

wherein the first circumferential region includes an inner radius defined by the intersection of the surface of the volute and the surface of the compressor outlet, and wherein a ratio of the fillet radius to the inner radius is less than or equal to 6.63 and greater than or equal to 3.67.

16. The assembly of claim 11, wherein the first circumferential region includes a portion having the wall thickness $t_2$ adjacent to the portion with the wall thickness $t_1$.

17. The assembly of claim 11, wherein the second circumferential region includes a portion with the wall thickness $t_3$ between two portions having the wall thickness $t_2$.

18. The assembly of claim 11, wherein the third circumferential region includes a portion with a wall thickness $t_5$ on the radially outer portion of the volute and a portion with the wall thickness $t_5$ on the radially inner portion of the volute, wherein the two portions with the wall thickness $t_5$ are adjacent opposite sides of the portion having the wall thickness $t_4$, and wherein the wall thickness $t_5$ is less than the wall thickness $t_4$.

19. The assembly of claim 11, wherein the fourth circumferential region includes two portions with the wall thickness $t_2$ on the radially outer portion of the volute and a portion with the wall thickness $t_2$ on the radially inner portion of the volute, wherein the two portions with the wall thickness $t_2$ are adjacent opposite sides of the portion having the wall thickness $t_3$.

\* \* \* \* \*

UNITED STATES PATENT AND TRADEMARK OFFICE
CERTIFICATE OF CORRECTION

PATENT NO. : 10,174,765 B2
APPLICATION NO. : 14/995953
DATED : January 8, 2019
INVENTOR(S) : Darryl A. Colson and Martuza Lokhandwalla It is certified that error appears in the above-identified patent and that said Letters Patent is hereby corrected as shown below:

In the Claims

Column 9, Line 24 Claim 11:
Delete "third wall"
Insert --wall--

Column 9, Line 25 Claim 11:
Delete "fourth wall"
Insert --wall--

Signed and Sealed this
Seventh Day of May, 2019

Andrei Iancu
*Director of the United States Patent and Trademark Office*